United States Patent
Ishibashi

(10) Patent No.: US 9,883,059 B2
(45) Date of Patent: Jan. 30, 2018

(54) IMAGE FORMING APPARATUS AND TERMINAL APPARATUS USING SHORT-RANGE COMMUNICATION FOR RETRIEVING IMAGE DATA FROM A NETWORK APPARATUS, DISPLAYING THE IMAGE DATA ON THE TERMINAL APPARATUS AND PRINTING THE IMAGE DATA ON THE IMAGE FORMING APPARATUS

(71) Applicant: BROTHER KOGYO KABUSHIKI KAISHA, Nagoya, Aichi (JP)

(72) Inventor: Masayuki Ishibashi, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 7 days.

(21) Appl. No.: 15/208,837

(22) Filed: Jul. 13, 2016

(65) Prior Publication Data

US 2017/0019542 A1    Jan. 19, 2017

(30) Foreign Application Priority Data

Jul. 16, 2015 (JP) .................... 2015-142426

(51) Int. Cl.
*H04N 1/00* (2006.01)
*G06F 3/12* (2006.01)

(52) U.S. Cl.
CPC ....... *H04N 1/0044* (2013.01); *H04N 1/00244* (2013.01); *H04N 1/00411* (2013.01);
(Continued)

(58) Field of Classification Search
CPC ............ H04N 1/0044; H04N 1/00244; H04N 1/0023; H04N 1/00167; H04N 1/00344; G06F 3/1292; G06F 3/1224; G06F 3/1268
(Continued)

(56) References Cited

U.S. PATENT DOCUMENTS

| 2011/0235085 A1 | 9/2011 | Jazayeri et al. |
| 2011/0299110 A1 | 12/2011 | Jazayeri et al. |

(Continued)

FOREIGN PATENT DOCUMENTS

| JP | 2013-522774 A | 6/2013 |
| JP | 2015-035208 A | 2/2015 |

(Continued)

*Primary Examiner* — Eric A Rust
(74) *Attorney, Agent, or Firm* — Scully, Scott, Murphy & Presser, PC

(57) ABSTRACT

A communication system may include a relay apparatus, an image processing apparatus and a terminal apparatus. The terminal apparatus may receive first access information for accessing converted data from the image processing apparatus in accordance with the short distance wireless communication technology. The terminal apparatus may display a converted image represented by converted data after the converted data is received from the relay apparatus in response to the receiving of the first access information. The image processing apparatus may receive an image processing command from the terminal apparatus in accordance with the short distance wireless communication technology after the first access information is received by the terminal apparatus. The image processing apparatus may receive a target image data from the relay apparatus and execute image process toward the target image data.

11 Claims, 11 Drawing Sheets

(52) U.S. Cl.
CPC .................. *H04N 2201/006* (2013.01); *H04N 2201/0094* (2013.01)

(58) Field of Classification Search
USPC ........................................................ 358/1.15
See application file for complete search history.

(56) References Cited

U.S. PATENT DOCUMENTS

| | | |
|---|---|---|
| 2012/0057193 A1 | 3/2012 | Jazayeri et al. |
| 2015/0015909 A1 | 1/2015 | Kaida |
| 2015/0049359 A1* | 2/2015 | Lee .................... G06F 3/1292 358/1.15 |
| 2015/0055178 A1 | 2/2015 | Ishibashi et al. |
| 2016/0065781 A1* | 3/2016 | Um .................... H04N 1/00204 358/1.15 |

FOREIGN PATENT DOCUMENTS

| | | |
|---|---|---|
| JP | 2015-041358 A | 3/2015 |
| WO | 2011/115987 A2 | 9/2011 |

\* cited by examiner

IMAGE FORMING APPARATUS AND TERMINAL APPARATUS USING SHORT-RANGE COMMUNICATION FOR RETRIEVING IMAGE DATA FROM A NETWORK APPARATUS, DISPLAYING THE IMAGE DATA ON THE TERMINAL APPARATUS AND PRINTING THE IMAGE DATA ON THE IMAGE FORMING APPARATUS

CROSS-REFERENCE TO RELATED APPLICATION

This application claims priority to Japanese Patent Application No. 2015-142426, filed on Jul. 16, 2015, the entire contents of which are hereby incorporated by reference into the present application.

TECHNICAL FIELD

The present teachings disclose a communication system including a relay apparatus, an image processing apparatus, and a terminal apparatus.

DESCRIPTION OF RELATED ART

A technique is known in which are image processing apparatus uses a terminal apparatus to cause image processing to be executed on image data in a server apparatus. For example, an image management system including a mobile terminal, an image processing apparatus, and an image management server is known. The image management server stores print jobs in association with user IDs. The mobile terminal causes the image management server to execute authentication using a key associated with a device ID of the image processing apparatus and a user ID. As a result, a print job associated with the device ID and the user ID is stored in the image management server. Accordingly when the image processing apparatus sends the device ID to the image management server, the image processing apparatus receives a print job associated with the device ID and executes printing.

SUMMARY

In the technique described above, however, no consideration whatsoever is given to confirmation by a user of a result of printing (in other words, image processing) prior to the printing. The present teachings disclose a technique which, prior to image processing executed by an image processing apparatus, provides information related to a result of the image processing using a terminal apparatus.

A communication system disclosed herein may comprise a relay apparatus, an image processing apparatus and a terminal apparatus, wherein the relay apparatus comprises: an interface configured to be capable of communicating with the image processing apparatus, the terminal apparatus and a server apparatus; and a controller, wherein the image processing apparatus comprises: a first interface configured to be capable of communicating with the relay apparatus; a second interface configured to be capable of communicating with the terminal apparatus in accordance with a short distance wireless communication technology being capable of communicating in response to coming close to the terminal apparatus within a predetermined distance; and a controller wherein the terminal apparatus comprises: a third interface configured to be capable of communicating with the relay apparatus; a fourth interface configured to be capable of communicating with the image processing apparatus in accordance with the short distance wireless communication technology; a display; and a controller, the controller of the relay apparatus configured to perform: receiving target image data from the server apparatus; converting the target image data so as to generate converted data; and sending first access information for accessing the converted data to the image processing apparatus, the controller of the image processing apparatus configured to perform: receiving the first access information from the relay apparatus; and sending the first access information to the terminal apparatus in accordance with the short distance wireless communication technology in response to detecting a proximity of the terminal apparatus within the predetermined distance, the controller of the terminal apparatus configured to perform: receiving the first access information from the image processing apparatus in accordance with the short distance wireless communication technology; receiving the converted data firm the relay apparatus in response to the receiving of the first access information; causing the display of the terminal apparatus to display a converted image represented by the converted data after the converted data is received; and sending an image processing command for executing an image process toward the target image data to the image processing apparatus in accordance with the short distance wireless communication technology after the first access information is received from the image processing apparatus, the controller of the image processing apparatus configured further to perform: receiving the image processing command from the terminal apparatus in accordance with the short distance wireless communication technology in response to detecting a proximity of the terminal apparatus within the predetermined distance; and sending a request signal for requesting the target image data to the relay apparatus in response to the receiving of the image pro sing command, the controller of the relay apparatus configured further to performs receiving the request signal from the image processing apparatus; and sending the target image data to the image processing apparatus in response to the receiving of the response signal, the controller of the image processing apparatus configured further to perform: receiving the tarot image data from the relay apparatus; and executing an image process toward the target image data.

Moreover, a method for realizing the communication system described above is also novel and useful. In addition, the respective apparatuses included, in the communication system described above (in other words, a relay apparatus, an image processing apparatus, and a terminal apparatus), computer-readable programs for realizing the respective apparatuses, and a computer-readable recording medium that stores the computer-readable programs are also novel and useful. Furthermore, a communication system including two apparatuses among the relay apparatus, the image processing apparatus, and the terminal apparatus described above as well as a method for realizing such a communication system are also novel and useful.

EMBODIMENTS

First Embodiment

Configuration of System

Figure 1:
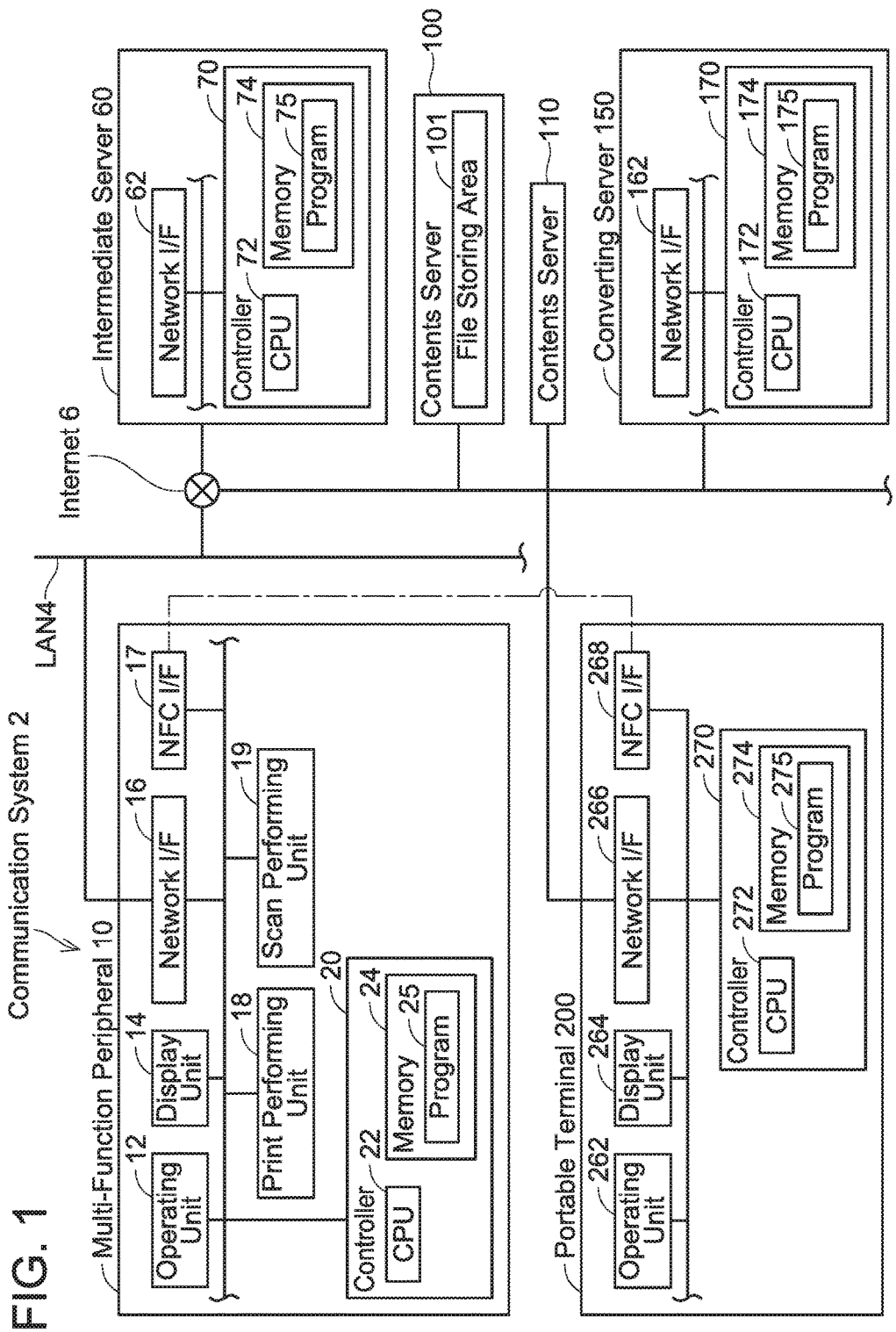
FIG. 1 shows a configuration of a communication system.

As shown in FIG. 1, a communication system 2 includes a multi-function peripheral 10, an intermediate server 60, content servers 100 and 110, a converting server 150, and a portable terminal 200. The multi-function peripheral 10 is connected to a LAN 4. The intermediate server 60, the content servers 100 and 110, and the converting server 150 are connected to the Internet 6. The portable terminal 200 is connected to the Internet 6 via a base station (not illustrated).

The multi-function peripheral 10 is capable of executing multiple functions such as a print function, a scan function, a copy function, and a FAX function. The multi-function peripheral 10 comprises an operating unit 12, a display unit 14, a network interface 16, an NFC (short for near field communication) interface 17, a print performing unit 18, a scan performing unit 19, and a controller 20. The operating unit 12 includes a plurality of keys. By operating the operating unit 12, a user can input various instructions to the multi-function peripheral 10. The display unit 14 is a display for displaying various kinds of information. The network interface 16 is connected to the LAN 4. Hereinafter, an interface may sometimes be described as an I/F.

The NFC_I/F 17 comprises an IC chip including a communication circuit and executes wireless communication in accordance with an NFC technology (hereinafter, referred to as "NFC communication") for so-called short distance wireless communication. The NFC technology is, for example, a wireless communication protocol based on an international standards such as ISO/IEC 21481 or ISO/IEC 18092. In a case where the multi-function peripheral 10 is in an NFC standby state, the NFC_I/F 17 detects proximity of an NFC_I/F of another apparatus (for example, an NFC_I/F 268 of the portable terminal 200) within a predetermined distance (for example, 10 cm) and automatically executes NFC communication with the NFC_I/F. On the other hand, in a case where the multi-function peripheral 10 is not in an NFC standby state, the NFC_I/F 17 cannot automatically execute NFC communication. Although details will be provided later, the multi-function peripheral 10 enters an NFC standby state by executing a process in accordance with NFC execution command data.

The print performing unit 18 includes a printing mechanism adopting an inkjet technology, a laser technology, or the like. The scan performing unit 19 includes a scanning mechanism such as a CCD and a CIS. The controller 20 includes a CPU 22 and a memory 24. The CPU 22 executes various processes in accordance with a program 25 stored in the memory 24.

The intermediate server 60 is a server configured as a separate body from the converting server 150 and the content servers 100 and 110. The intermediate server 60 is a server for processing various types of data between the content servers 100 and 110 and the multi-function peripheral 10. The intermediate server 60 is a server for mediating provision of various types of data from the content servers 100 and 110 to the multi-function peripheral 10. The intermediate server 60 is a server provided by a vendor of the multi-function peripheral 10. The intermediate server 60 comprises a network I/F 62 and a controller 70. The network I/F 62 is connected to the Internet 6. The controller 70 comprises a CPU 72 and a memory 74. The memory 74 stores a program 75. The CPU 72 executes various processes in accordance with the program 75.

The converting server 150 is a server configured as a separate body from the intermediate server 60 and the content servers 100 and 110. The converting server 150 is a server which converts a target image file (to be described later) to generate a preview image file. The converting server 150 may be a server provided by the vendor of the multi-function peripheral 10. The converting server 150 comprises a network I/F 162 and a controller 170. The network I/F 162 is connected to the Internet 6. The controller 170 includes a CPU 172 and a memory 174. The memory 174 stores a program 175. The CPU 172 executes various processes in accordance with the program 175.

The portable terminal 200 is a portable terminal mounted with an Android (a registered trademark of Google Inc.) platform. The portable terminal 200 comprises an operating unit 262, a display unit 264, a network IN 266, an NFC_I/F 268, and a controller 270. The operating unit 262 is a touch panel comprising a transparent member. The operating unit 262 (in other words, the touch panel) is arranged so as to cover a surface of the display unit 264. The operating unit 262 detects a position where a finger of the user or the like has come into proximity or contact and outputs information on the detected position to the CPU 272. In other words, by operating the touch panel, the user can input various instructions to the portable terminal 200. Since the operation is executed on the touch panel covering the surface of the display unit 264, the operation may be described as being executed on the display unit 264. The display unit. 264 is a display for displaying various kinds of information and comprises LCD, an organic EL panel, or the like. The network IN 266 is connected to a base station (not illustrated). The NFC_I/F 268 has a similar configuration to the NFC_I/F 17. The controller 270 includes a CPU 272 and a memory 274. The CPU 272 executes various processes in accordance with a program 275 stored in the memory 274.

An important note regarding the present disclosure will be described as follows. In the present disclosure, a description reading "the CPU 72 of the intermediate server 60 receives various types of information" is assumed to include a technical content that is described as "the CPU 72 of the intermediate server 60 acquires various types of information via the network I/F 62". In addition, a description reading "the CPU 72 of the intermediate server 60 sends various types of information" is assumed to include a technical content that is described as "the CPU 72 of the intermediate server 60 outputs various types of information via the network I/F 62". Furthermore, similar notes apply to the CPU 172 and the network I/F 162 of the converting server 150. Moreover, similar notes apply to the CPU 22 and the network I/F 16 of the multi-function peripheral 10. However, a description reading "the CPU 22 of the multi-function peripheral 10 receives (or sends) various types of information via the NFC_1/F 17" is an exception to this rule. In addition, similar notes apply to the CPU 272 and the network I/F 266 of the portable terminal 200. However, a description reading "the CPU 272 of the portable terminal 200 receives (or sends) various types of information via the NFC_I/F 268" is an exception to this rule.

Although a case where the intermediate server 60 and the converting server 150 are connected by the Internet 6 (in other words, a case where an apparatus that functions as the intermediate server 60 and an apparatus that functions as the converting server 150 are arranged at positions physically separated from each other) is described herein, modes are not limited thereto. The intermediate server 60 and the converting server 150 may be realized by a sin server apparatus. In a case where the intermediate server 60 and the converting server 150 are realized by a single server apparatus, a program that functions as the intermediate server 60 and a program that functions as the converting server 150 run on the single server apparatus and communication between the two programs is performed via a bus line or the like in the server apparatus. Moreover, in the case of a configuration in which the intermediate server 60 and the converting server 150 are realized by a single server apparatus, communication described herein as communication performed between the intermediate server 60 and the converting server 150 may be understood as being performed between the program that functions as the intermediate server 60 and the program that functions as the converting server 150. In addition, a program which functions as the intermediate server 60 and which also functions as the converting server 150 may be realized in a mode in which the program runs on a single server apparatus. In this case, communication described herein as communication performed between the intermediate server 60 and the converting server 150 may be replaced by exchange of data in the program which functions as the intermediate server 60 and which also functions as the converting server 150.

The content servers 100 and 110 are servers provided by the vendor of the multi-function peripheral 10 to be used for online services. The content servers 100 and 110 are so-called storage servers. Moreover, the content servers 100 and 110 may be servers used in an online service which lends data storage areas of the content servers 100 and 110 to the user. Examples of online services include known services such as "Evernote (registered trademark)", "Google (registered trademark) Docs", "Picasa (registered trademark)", and "Facebook (registered trademark)". A user of an online service can upload and download various types of data to and from the storage area assigned to the user via the Internet 6.

The content server 100 comprises a file storing area 101. The file storing area 101 is an area in which an image file and file information for identifying the image file are stored in association with each other.

A service provider that provides a content server publicly offers a dedicated API (short for Application Program Interface) for requesting the content server to send back folder names of folders stored in the content server and file names of various types of data stored in the content server. Therefore, in the present embodiment, the intermediate server 60 is provided so as to enable the multi-function peripheral 10 to download data from each of a plurality of content servers without having the multi-function peripheral 10 store a large number of programs. In other words, the intermediate server 60 stores a plurality of APIs for executing service with each of a plurality of content servers. In addition, in a situation where the multi-function peripheral 10 is to download data from a particular content server (for example, the content server 100) among the plurality of content servers, the intermediate server 60 uses an API for executing service with the particular content server to execute various types of communication (for example, the communications of S31 in FIG. 2 and S63 in FIG. 3) with the particular content server. Accordingly, the multi-function peripheral 10 can download data from the particular content server without storing the API for executing service with the particular content server.

(Operations of Communication System 2)

Figure 2:
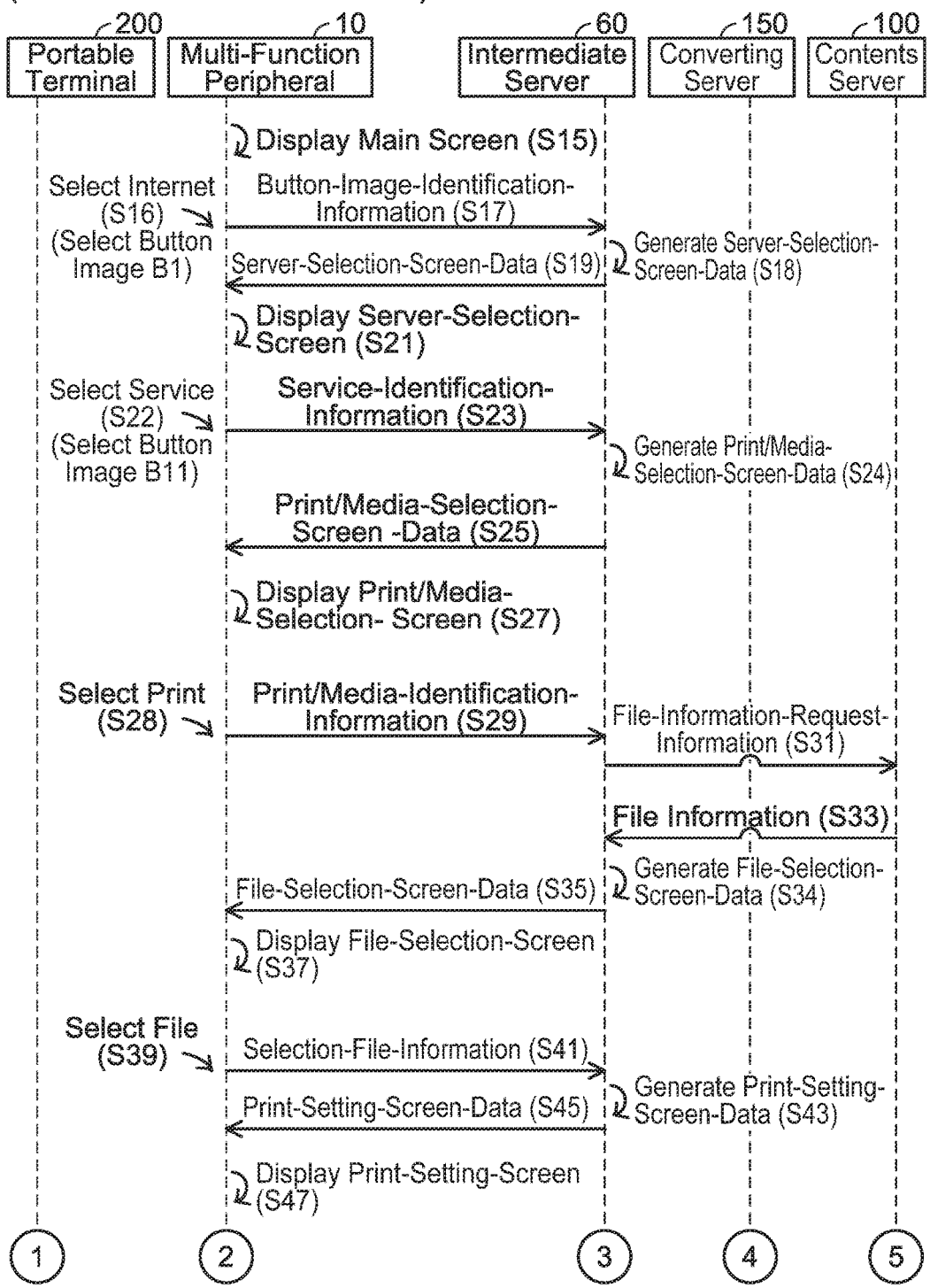
FIG. 2 shows a sequence diagram of respective processes executed by respective devices.

Operations of the communication system 2 will be described using the sequence diagrams of FIGS. 2 to 4. When the CPU 22 of the multi-function peripheral 10 accepts a command for causing a main screen to be displayed, in S15, the CPU 22 causes the main screen to be displayed on the display unit 14. The command for causing the main screen to be displayed may be input by the user from the operating unit 12. Data representing the main screen may be stored in the memory 24 in advance. FIG. 5 shows an example of a main screen 201. The main screen 201 includes button images B1 to B4. The button images B1 to B4 are images for accepting input of execution commands with respect to a plurality of functions. Functions accepted by the button images B1 to B4 are, respectively, an Internet function, a copy function, a FAX function, and a print function.

In the description example of the present embodiment, a case where various types of data are downloaded from the content server 100 will be described. In this case, in S16, the button image B1 included in the main screen 201 is selected. In S17, the CPU 22 of the multi-function peripheral 10 sends button image identification information for identifying the selected button image B1 to the intermediate server 60. Examples of the button image identification information include "Internet" which is a name of the button image B1.

Figure 6:
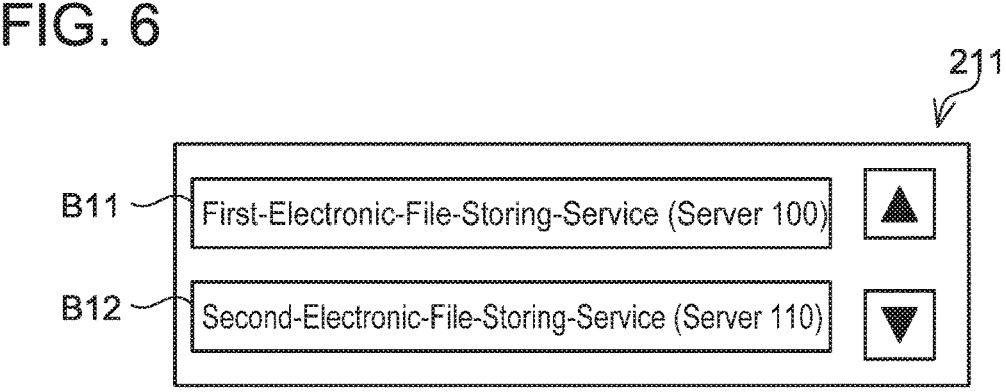
FIG. 6 shows a display example of a server selection screen.

When the CPU 72 of the intermediate server 60 receives the button image identification information from the multi-function peripheral 10, the CPU 72 specifies a server selection screen 211 shown in FIG. 6 as screen data to be next sent to the multi-function peripheral 10. The server selection screen 211 is a screen which causes any of the content servers 100 and 110 to be selected.

In S18, the CPU 72 of the intermediate server 60 generates server selection screen data for causing the server selection screen 211 to be displayed. The memory 74 stores information (not illustrated) indicating what kind of information need to be included in the server selection screen data. The CPU 72 of the intermediate server 60 generates the server selection screen data in accordance with this information. The server selection screen data includes information indicating that button images B11 and B12 are included in the server selection screen 211, information indicating that a screen for selecting any of the button images B11 and B12 is to be displayed, information indicating that server names "Server 100" and "Server 110" respectively correspond to the button images B11 and B12, and information indicating character strings to be displayed attached to the button images B11 and B12. In S19, the CPU 72 of the intermediate server 60 sends the server selection screen data to the multi-function peripheral 10.

When the CPU 22 of the multi-function peripheral 10 receives the server selection screen data from the intermediate server 60, in S21, the CPU 22 causes the server selection screen 211 to be displayed on the display unit 14. As shown in FIG. 6, the server selection screen 211 includes the button images B11 and B12. The button images B11 and B12 are images for accepting respective selections of the content servers 100 and 110. Moreover, the CPU 22 of the multi-function peripheral 10 generates bitmap information and the like for displaying images of the button images B11 and B12 based on the server selection screen data received from the intermediate server 60 and causes the server selection screen 211 to be displayed on the display unit 14. In this manner, since bitmap information is created at the multi-function peripheral 10, bitmap information for displaying images of the button images B11 and B12 need not be included in the server selection screen data. In addition, bitmap information for displaying upward and downward arrow buttons shown in FIG. 6 also need not be included. The user operates the operating unit 12 to select a button image representing a content server from which data is to be downloaded among the contents of the server selection screen 211. The description of the present embodiment will be continued assuming a case where the user selects the button image B11 (in other words, the content server 100) in S22.

In S23, the CPU 22 of the multi-function peripheral 10 sends service identification information corresponding to the button image selected by the user to the intermediate server 60. In the description example of the present embodiment, service identification information including the server name "Server 100" is sent to the intermediate server 60. In S24, based on the service identification information received from the multi-function peripheral 10, the CPU 72 of the intermediate server 60 generates print/media selection screen data for causing a print/media selection screen to be displayed. The print/media selection screen is a screen for accepting input with respect to whether a print process is to be executed or a process of saving in a medium is to be executed as a process using the data downloaded from the content server. Examples of a medium include a memory card (not illustrated).

In S25, the CPU 72 of the intermediate server 60 sends the print/media selection screen data to the multi-function peripheral 10. When the CPU 22 of the multi-function peripheral 10 receives the print/media selection screen data from the intermediate server 60, in 527, the CPU 22 causes the print/media selection screen to be displayed on the display unit 14. The print/media selection screen includes images for accepting respective selections of a print process and a process of saving to the medium. Since contents of the print/media selection screen are similar to those of the server selection screen 211 described earlier, a detailed description will be omitted. In S28, the user operates the operating unit 12 to select a button image representing a process to be executed among the contents of the print/media selection screen. The description of the present embodiment will be continued assuming a case where a selection of the button image for executing printing is accepted.

In S29, the CPU 22 of the multi-function peripheral 10 sends print/media identification information corresponding to the button image selected by the user to the intermediate server 60. In the description example of the present embodiment, information indicating that printing has been selected is sent. In S31, the CPU 72 of the intermediate server 60 sends file information request information to the content server 100. The file information request information refers to information for requesting file information. The file information refers to information for identifying each of a plurality of image files stored in the selected content server. Examples of file information include a file name.

When the content server 100 receives the file information request information from the intermediate server 60, in S33, the content server 100 sends file information to the intermediate server 60.

Figure 7:
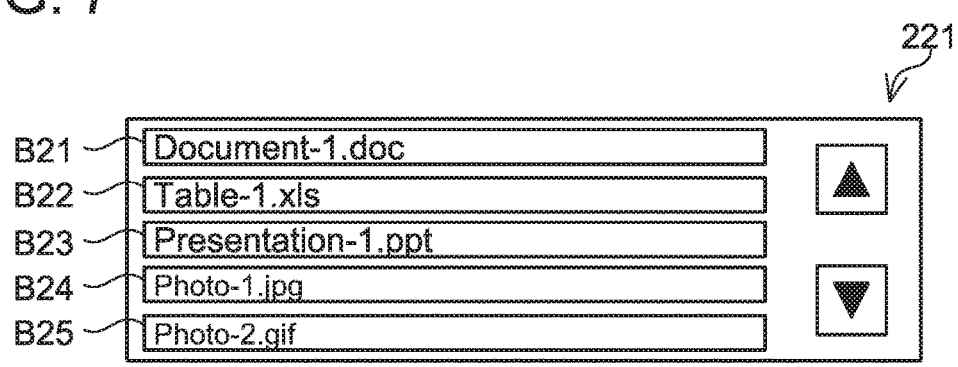
FIG. 7 shows a display example of a file selection screen.

In S34, the CPU 72 of the intermediate server 60 generates file selection screen data for causing a file selection screen 221 shown in FIG. 7 to be displayed based on the file information received in S33. The file selection screen 221 is a screen for having the user select an image file to be downloaded. In the description example in the present embodiment, the file selection screen data includes information indicating that button images B21 to B25 are included in the file selection screen 221, information indicating that a screen for selecting any of the button images B21 to B25 is to be displayed, and information indicating file names respectively corresponding to the button images B21 to B25. In S35, the CPU 72 sends the file selection screen data to the multifunction peripheral 10.

When the CPU 22 of the multi-function peripheral 10 receives the file selection screen data from the intermediate server 60, in S37, the CPU 22 causes the display unit 14 to display the file selection screen 221 shown in FIG. 7. In addition, the CPU 22 accepts a process of selecting a selected image file among the plurality of image files stored in the content server 100. The selected image file refers to a file selected as a downloaded object from the content server 100. The CPU 22 may accept a process of selecting a plurality of selected image files. As shown in FIG. 7, the file selection screen 221 includes the button images B21 to B25. Each of the button images B21 to B25 is an image for accepting selection of a selected image file. In S39, the user operates the operating unit 12 to select a button image for accessing the selected image file to be downloaded among the contents of the file selection screen 221.

In S41, the CPU 22 of the multi-function peripheral 10 sends selected file information corresponding to the button image selected by the user to the intermediate server 60. The selected file information refers to information for identifying a selected image file. In the description example of the present embodiment, information indicating that data corresponding to the button image B21 has been selected as selected data is sent. The selected file information may be described in accordance with a URL (short for Uniform Resource Locator) description form. In 843, based on the selected file information, the CPU 72 of the intermediate server 60 generates print setting screen data for causing a print setting screen to be displayed. The print setting screen refers to a screen for accepting input of various printing parameters (for example, a scale of an image, an orientation of printing, a paper size, a duplex printing mode, and a color mode).

In S45, the CPU 72 of the intermediate server 60 sends the print setting screen data to the multi-function peripheral 10. When the CPU 22 of the multi-function peripheral 10 receives the print setting screen data from the intermediate server 60, in S47, the CPU 22 causes the print setting screen to be displayed on the display unit 14. The CPU 22 accepts input of various print settings by the user via the operating unit 12.

Figure 3:
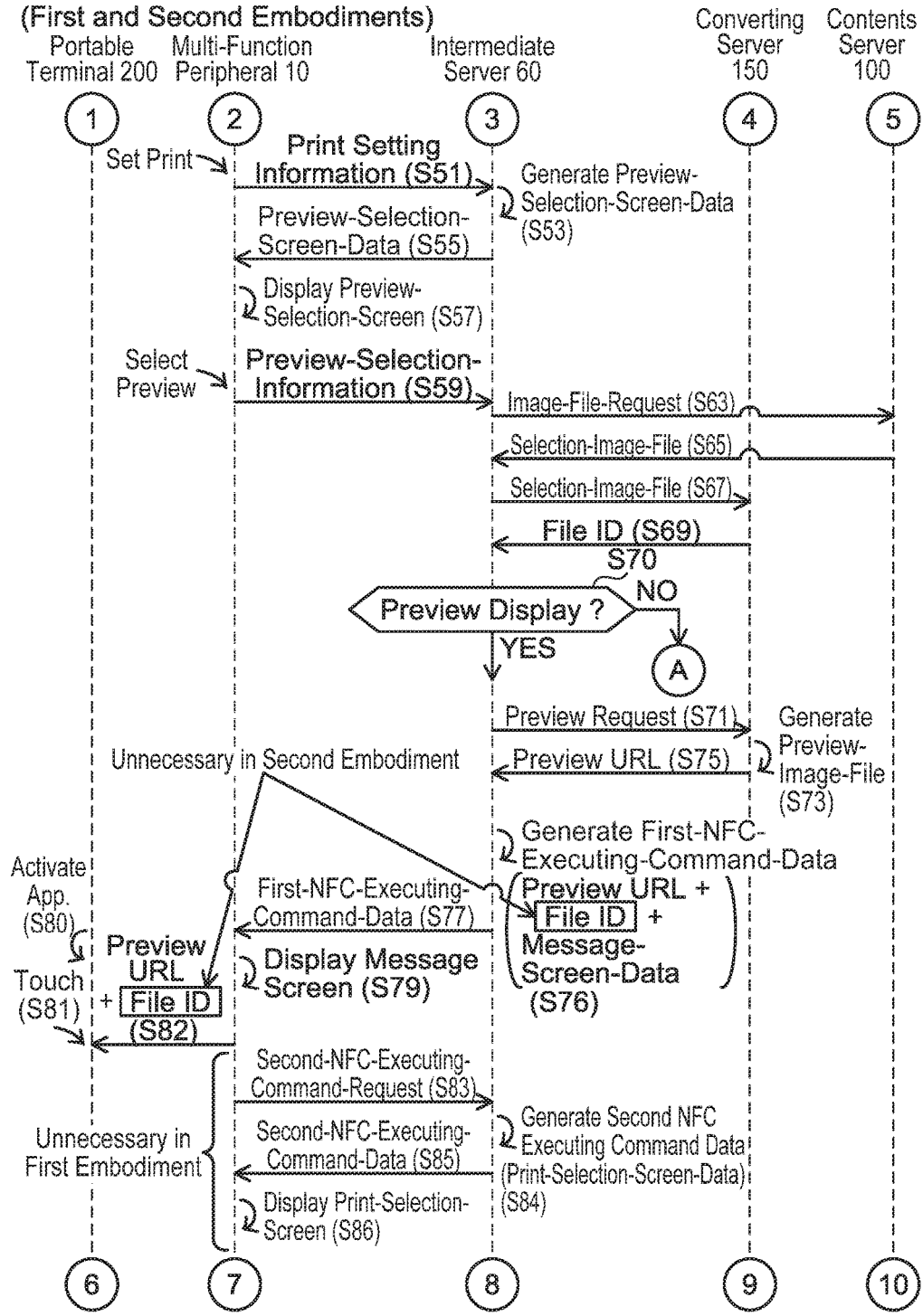
FIG. 3 shows a sequence diagram of respective processes executed by respective devices.

In S51 in FIG. 3, the CPU 22 of the multi-function peripheral 10 sends print setting information to the intermediate server 60. When the intermediate server 60 receives the print setting information from the multi-function peripheral 10, in S53, the intermediate server 60 generates preview selection screen data. A preview selection screen 231 shown in FIG. 8 which is represented by the preview selection screen data is a screen for having the user select whether to display a preview image or not. The preview selection screen data includes a message inquiring whether or not a preview image is to be displayed, information indicating that button images B31 and B32 are included in the preview selection screen 231, information indicating that a screen for selecting any of the button images B31 and B32 is to be displayed, and information indicating that "OK" and "Cancel" respectively correspond to the button images B31 and B32. In S55, the CPU 72 of the intermediate server 60 sends the preview selection screen data to the multi-function peripheral 10.

Figure 8:
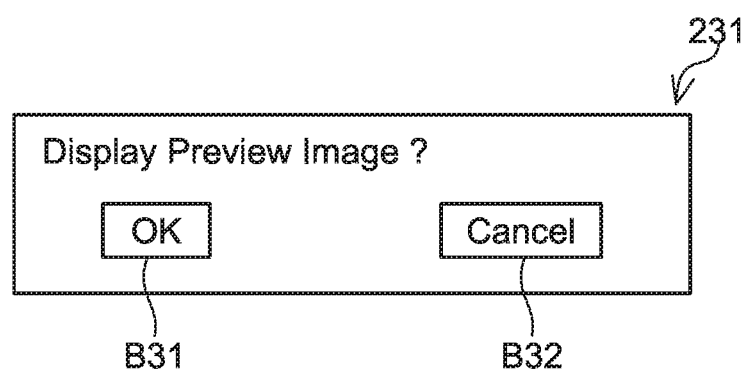
FIG. 8 shows a display example of a preview selection screen.

When the CPU 22 of the multi-function peripheral 10 receives the preview selection screen data from the intermediate server 60, in S57, the CPU 22 causes the preview selection screen 231 shown in FIG. 8 to be displayed on the display unit 14. The preview selection screen. 231 includes a message inquiring whether or not a preview image is to be displayed and the button images B31 and B32. The button images B31 and B32 are, respectively, images for accepting display and non-display of a preview image. The user operates the operating unit 12 and selects the button image B31 (in other words, "OK") or B32 (in other words, "Cancel") among the contents of the preview selection screen 231.

In S59, the CPU 22 of the multi-function peripheral 10 sends preview selection information corresponding to the button image selected by the user to the intermediate server 60. When the CPU 72 of the intermediate server 60 receives the preview selection information from the multi-function peripheral 10, in S63, the CPU 72 of the intermediate server 60 sends an image file request to the content server 100. The image file request refers to a signal for requesting a selected image file that is identified by selected file information. In addition, the image file request is a signal including the selected file information received in S41. In S65, the CPU 72 of the intermediate server 60 receives a selected image file from the content server 100 and, in S67, the CPU 72 sends the selected image file to the converting server 150.

When the CPU 172 of the converting server 150 receives the selected image file from the intermediate server 60, the CPU 172 generates a file ID for identifying the selected image file. A file ID is information that is managed by the converting server 150 and differs from the selected file information that is managed by the content server 100. The CPU 172 stores the generated file ID and the selected image file in the memory 174 in association with each other. In S69, the CPU 172 sends the file ID to the intermediate server 60.

When the CPU 72 of the intermediate server 60 receives the file ID from the converting server 150, in S70, the CPU 72 determines whether or not a preview image is to be displayed. When the preview selection information indicates "Cancel" (S70: NO), the CPU 72 of the intermediate server 60 advances to S117 in FIG. 4. On the other hand, when the preview selection information indicates "OK" (S70: YES), the CPU 72 of the intermediate server 60 advances to S71.

In S71, a preview request including the file ID is sent to the converting server 150. When the CPU 172 of the converting server 150 receives the preview request from the intermediate server 60, the CPU 172 reads a selected image file that is identified by the file ID from the memory 174. In S73, the CPU 172 converts the selected image file and generates a preview image file. A preview image represented by the preview image file represents a print result when the multi-function peripheral 10 prints an image represented by the selected image file. In addition, the preview image file is data which has a generic image format that can be read and displayed by the multi-function peripheral 10. Furthermore, the CPU 172 generates a preview URL and stores the preview URL and the preview image file in the memory 174 in association with the file ID. The preview URL refers to information for accessing the preview image file and indicates a position of the preview image file on the Internet 6.

In S75, the CPU 172 of the converting server 150 sends the preview URL to the intermediate server 60. When the CPU 72 of the intermediate server 60 receives the preview URL from the converting server 150, in S76, the CPU 72 generates first NFC execution command data. The first NFC execution command data refers to data for instructing the multi-function peripheral 10 that NFC communication with the portable terminal 200 is to be executed. The first NFC execution command data includes a preview URL, a file ID, and message screen data. Message screen data refers to data including a message prompting the portable terminal 200 to be brought into proximity of the multi-function peripheral 10.

Figure 9:
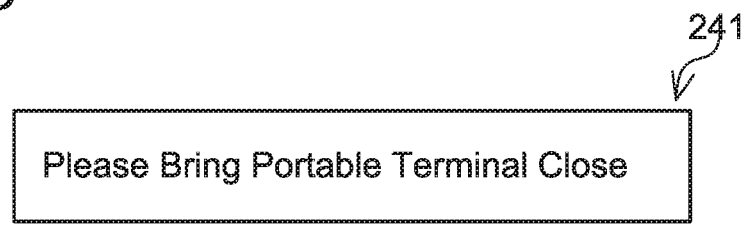
FIG. 9 shows a display example of a message screen.

In S77, the CPU 72 of the intermediate server 60 sends the first NFC execution command data to the multi-function peripheral 10. When the CPU 22 of the multi-function peripheral 10 receives the first NFC execution command data from the intermediate server 60, in S79, the CPU 22 executes a process in accordance with the first NFC execution command data. Specifically, the CPU 22 displays a message screen 241 shown in FIG. 9 which is represented by message screen data on the display unit 14 and enters an NFC standby state. As described earlier, the NFC standby state is a state in which execution of NFC communication is enabled.

The user executes an operation for activating an application program (hereinafter, referred to as an "application") (not illustrated) in the memory 274 of the portable terminal 200. Furthermore, the user selects a preview display mode for displaying a preview screen among a plurality of modes that can be executed by the application. Due to this, in S80, the CPU 272 of the portable terminal 200 activates the application and executes the preview display mode. In addition, the CPU 272 enters a state where NFC communication can be executed in order to receive information from the multi-function peripheral 10.

In S81, the user brings the NFC_I/F 268 of the portable terminal 200 and the NFC_I/F 17 of the multi-function peripheral 10 into proximity within a predetermined distance (hereinafter, executing this movement will be described "bringing the portable terminal 200 into proximity of the multi-function peripheral 10"). Accordingly, in S82, the CPU 22 of the multi-function peripheral 10 automatically executes NFC communication with the portable terminal 200. In other words, the CPU 22 sends a preview URL and a file ID to the portable terminal 200 via the NFC_I/F 17. The CPU 272 of the portable terminal 200 receives the preview URL and the file ID from the multi-function peripheral 10 via the NFC_I/F 268.

The processes of S83 to S86 are not executed in the present first embodiment. Therefore, descriptions thereof will be omitted.

In S87, the CPU 272 of the portable terminal 200 sends a preview request including the preview URL to the converting server 150. A preview request refers to a signal for requesting a preview image file that represents a preview image. When the CPU 172 of the converting server 150 receives the preview request from the portable terminal 200, in S88, the CPU 172 sends the preview image file stored in association with the preview URL to the portable terminal 200.

Figure 10:
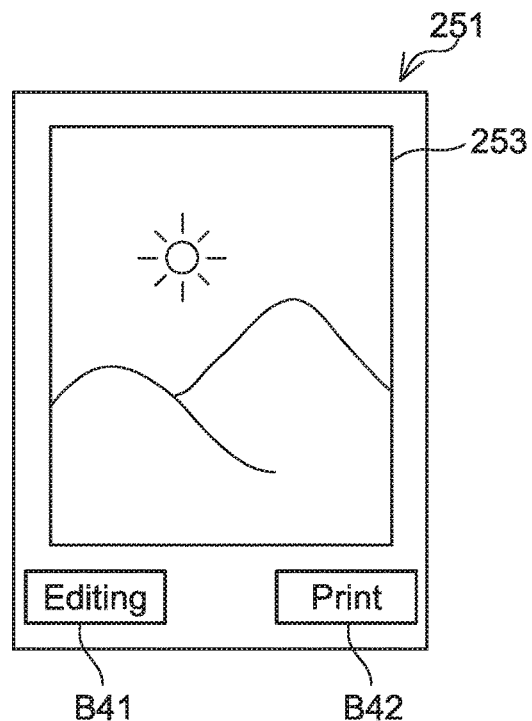
FIG. 10 shows a display example of a preview screen.

When the CPU 272 of the portable terminal 200 receives the preview image file from the converting server 150, in S89, the CPU 272 displays a preview screen on the display unit 264. FIG. 10 shows an example of a preview screen 251. The preview screen 251 includes a preview image 253 and button images B41 and B42. The preview image 253 is an image representing a print result when the image represented by the selected image file is printed. The button image 341 is an image for accepting editing of the preview image file. The button image B42 is an image for accepting execution of printing of the image. Moreover, information indicating that the button images B41 and B42 shown in FIG. 10 are included in the preview screen 251, information indicating that a screen for selecting any of the button images 341 and B42 is to be displayed, and information indicating that "edit" and "print" respectively correspond to the button images B41 and B42 are stored in advance in the memory 274 of the portable terminal 200. The CPU 272 can generate the preview screen 251 using the information.

In S91, the CPU 272 of the portable terminal 200 determines whether or not an editing instruction for accepting editing of the preview image file has been input by the user. An editing instruction includes a selection operation for selecting the button image B41 and a parameter operation for changing parameters to be used by a print process. Parameters include a scale of an image, an orientation of printing (portrait or landscape), a paper size (for example, A4, A5, B4, or B5), a duplex printing mode (ON or OFF), and a color mode (color or monochrome).

Figure 11:
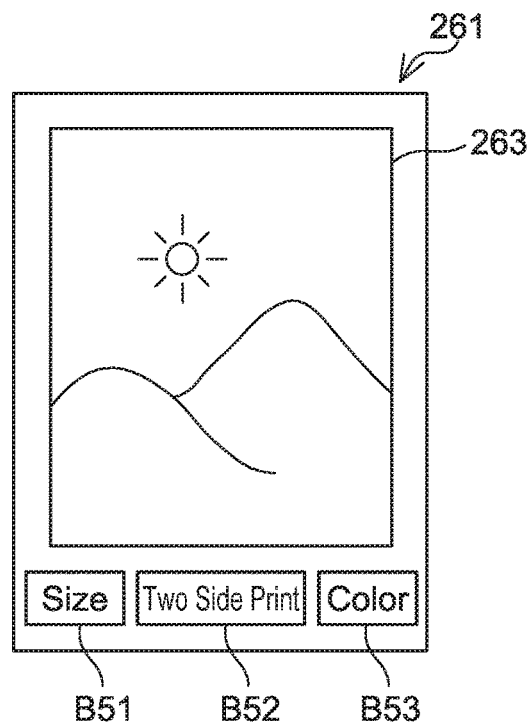
FIG. 11 shows a display example of a preview screen in a case where editing is selected.

First, when the button image B41 is selected on the preview screen 251, the CPU 272 of the portable terminal 200 causes the display unit 264 to display a preview screen 261 shown in FIG. 11. The preview screen 261 includes a preview image 263 and button images B51 to B53. The preview image 263 is similar to the preview image 253. The button image B51 is an image for accepting a change in paper size. The button image B52 is an image for accepting a change with respect to ON and OFF of the duplex printing mode. The button image B53 is an image for accepting a change with respect to ON and OFF of the color mode. The parameter operations described above are executed on the preview screen 261. Specifically, a parameter operation for increasing (or reducing) the scale is, for example, a pinch-in or a pinch-out operation that is executed on the preview image 263. In addition, a parameter operation for changing the printing orientation from portrait to landscape is for example, an operation referred to as rotation that is executed on the preview image 263.

Furthermore, a parameter operation for changing the paper size is, for example, the operation described below. First, when the button image B51 is selected by the user, the CPU 272 displays a plurality of button images (not illustrated) on the preview screen 261. The plurality of button images are, respectively, images for changing the paper size to A4, A5, B4, and B5. The user selects one button image among the plurality of button images. A parameter operation for changing the paper size is an operation of selecting the button image B51 and further selecting one of the button images described above. A parameter operation for making a change with respect to ON or OFF of the duplex printing mode and a parameter operation for making a change with respect to ON or OFF of the color mode are described in a similar manner.

In a case where the button image B42 is selected (S91: NO), the CPU 272 of the portable terminal 200 advances to S112. On the other hand, in a case where an editing instruction is input (S91: YES), the CPU 272 advances to S95. In S95, the CPU 272 generates first editing information in accordance with contents of the parameter operation performed in S91. The first editing information is information used in order to generate an edited preview image file (to be described later) and is information that can be interpreted by the converting server 150.

in S99, the CPU 272 of the portable terminal 200 sends the first editing information and the file ID to the converting server 150. When the CPU 172 of the converting server 150 receives the first editing information and the file ID from the portable terminal 200, in S103, the CPU 172 generates an edited preview image file. Specifically, first, the CPU 172 specifies a preview image file stored in association with the file ID, edits the preview image file based on the first editing information, and generates an edited preview image file that represents an edited preview image. The edited preview image is a preview image reflecting contents of a parameter operation. Furthermore, the CPU 172 generates an edited preview URL and stores the edited preview URL and the edited preview image file in the memory 174 in association with the file ID. The edited preview URL refers to information for accessing the edited preview image file and indicates a position of the edited preview image file on the Internet 6.

In S104, the CPU 172 of the converting server 150 sends the edited preview URL to the portable terminal 200. When the CPU 272 of the portable terminal 200 receives the edited preview URL from the converting server 150, the CPU 272 of the portable terminal 200 sends an edited preview request including the edited preview URL to the converting server 150. The edited preview request refers to a signal for requesting an edited preview image file. When the CPU 172 of the converting server 150 receives the edited preview request from the portable terminal 200, in S107, the CPU 172 sends the edited preview image file stored in association with the edited preview URL to the portable terminal 200.

Figure 12:
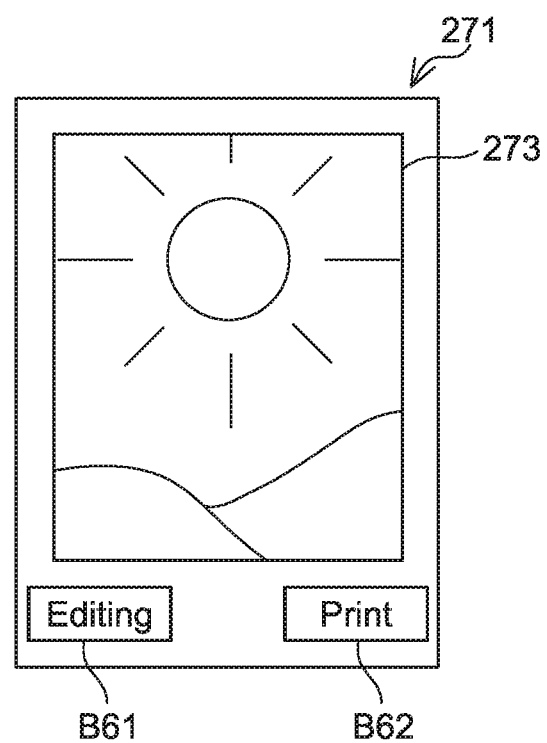
FIG. 12 shows a display example of an edited preview screen.

When the CPU 272 of the portable terminal 200 receives the edited preview image file from the converting server 150, in S109, the CPU 272 displays an edited preview screen on the display unit 264. FIG. 12 shows an example of an edited preview screen 271. The edited preview screen 271 represents an example of a case where, in S91, a parameter operation for increasing scale (in other words, a pinch-out operation) has been executed. The edited preview screen 271 includes an edited preview image 273 and button images B61 and B62. The edited preview image 273 is an image representing a print result when the image represented by the selected image file is printed on a printing medium and is an image reflecting the first editing information. The edited preview image 273 corresponds to an enlarged image of the preview image 253. The button images B61 and B62 are, respectively, similar to the button images B41 and B42. Once S109 is completed, processing returns to S91. In S91 which is executed via S109, the CPU 272 determines whether or not an editing instruction for accepting editing of the edited preview image file has been input by the user.

As described earlier, when a determination of NO is made in S91, processing advances to S110. S110 is similar to S81 shown in FIG. 3. In S112, the CPU 272 of the portable terminal 200 generates a print instruction. A print instruction refers to an instruction for causing the multi-function peripheral 10 to execute printing of the selected image file and includes a file ID. Moreover, in a case where one or more editing instructions are input in S91 (in other words, when a determination of YES is made one or more times in S91), the print instruction further includes second editing information. An example of a case where editing instructions are input twice is a case where, in a first S91, a parameter operation for increasing scale (in other words, a pinch-out operation) is executed and, in a second S91, a parameter operation for switching ON the color mode is executed. Second editing information refers to information corresponding to one or more pieces of first editing information generated by the input of one or more editing instructions and is information used in order to generate print data (to be described later). In the example described above, the second editing information corresponds to two pieces of first editing information (in other words, the first editing information corresponding to a parameter operation for increasing scale and the first editing information corresponding to a parameter operation for switching ON the color mode). In addition, the second editing information is information that can be interpreted by the converting server 150. In S114, the CPU 272 sends the print instruction to the multi-function peripheral 10 via the NFC_I/F 268.

When the CPU 22 of the multi-function peripheral 10 receives the print instruction from the portable terminal 200 via the NFC_I/F 17, in S115, the CPU 22 sends a print execution command request to the intermediate server 60. The print execution command request refers to a signal for requesting print execution command data and includes a file ID. When the CPU 72 of the intermediate server 60 receives a print URL request from the portable terminal 200, in S117, the CPU 72 sends the print URL request to the converting server 150. The print URL request refers to a signal for requesting a print URL and includes a file ID. The print URL refers to information for accessing print data (to be described later) and is information indicating a position of the print data on the Internet 6.

When the CPU 172 of the converting server 150 receives the print URL request from the intermediate server 60, in S119, the CPU 172 generates print data. Specifically, first, the CPU 172 specifies a selected image file stored in association with the file ID in the print URL request and generates print data corresponding to the selected image file. In a case where the selected image file has a data format that can be interpreted by the multi-function peripheral 10, the print data may be the selected image file itself. On the other hand, in a ease where the selected image file does not have a data format that can be interpreted by the multi-function peripheral 10, the print data may be data obtained by converting the selected image file so as to acquire a data format that can be interpreted by the multi-function peripheral 10. Moreover, claimed "target image data" includes print data in addition to a target image file. Furthermore, the CPU 172 generates a print URL and stores the print URL and the print data in the memory 174 in association with each other. The print URL refers to information for accessing the print data and is information indicating a position of the print data on the Internet 6.

In S121, the CPU 172 of the converting server 150 sends the print URL to the intermediate server 60. When the CPU 72 of the intermediate server 60 receives the print URL from the converting server 150, in S122, the CPU 72 generates a print execution command and, in S123, the CPU 72 sends the print execution command to the multi-function peripheral 10. A print command refers to an instruction for causing the multi-function peripheral 10 to execute printing of a selected image file and includes a print URL. When the CPU 22 of the multi-function peripheral 10 receives the print execution command from the intermediate server 60, in S125, the CPU 22 executes a process in accordance with the print execution command. Specifically, the CPU 22 sends a print data request to the converting server 150. The print data request refers to a signal for requesting print data and includes a print URL.

When the CPU 172 of the converting server 150 receives the print data request from the multi-function peripheral 10, the CPU 172 specifies the print data stored in association with the print URL in the print data request and, in S127, sends the print data to the multi-function peripheral 10. When the CPU 22 of the multi-function peripheral 10 receives the print data from the converting server 150, in S129, the CPU 22 can cause the print performing unit 18 to execute printing of the print data in accordance with the print command of S123.

Effect of First Embodiment

In the communication system 2 according to the present embodiment, the portable terminal 200 receives a preview URL for accessing a preview image file from the multi-function peripheral 10 (S82 in FIG. 3) in accordance with the NFC technology. When the portable terminal 200 receives the preview image file from the converting server 150 in accordance with receiving the preview URL (S88 in FIG. 4), the portable terminal 200 displays a preview image represented by the preview image file (S89 and FIG. 10). When the multi-function peripheral 10 receives a print instruction from the portable terminal 200 in accordance with the NFC technology (S114 in FIG. 4) after the preview URL is received by the portable terminal 200, the multi-function peripheral 10 receives print data from the converting server 150 (S127) and executes printing of the print data (S129). In other words, before printing of print data is executed, the portable terminal 200 displays a preview image related to a selected image file and provides the user with information related to a print result. Therefore, by viewing the preview image displayed on the portable terminal 200, the user can check a print result before printing is executed.

Figure 4:
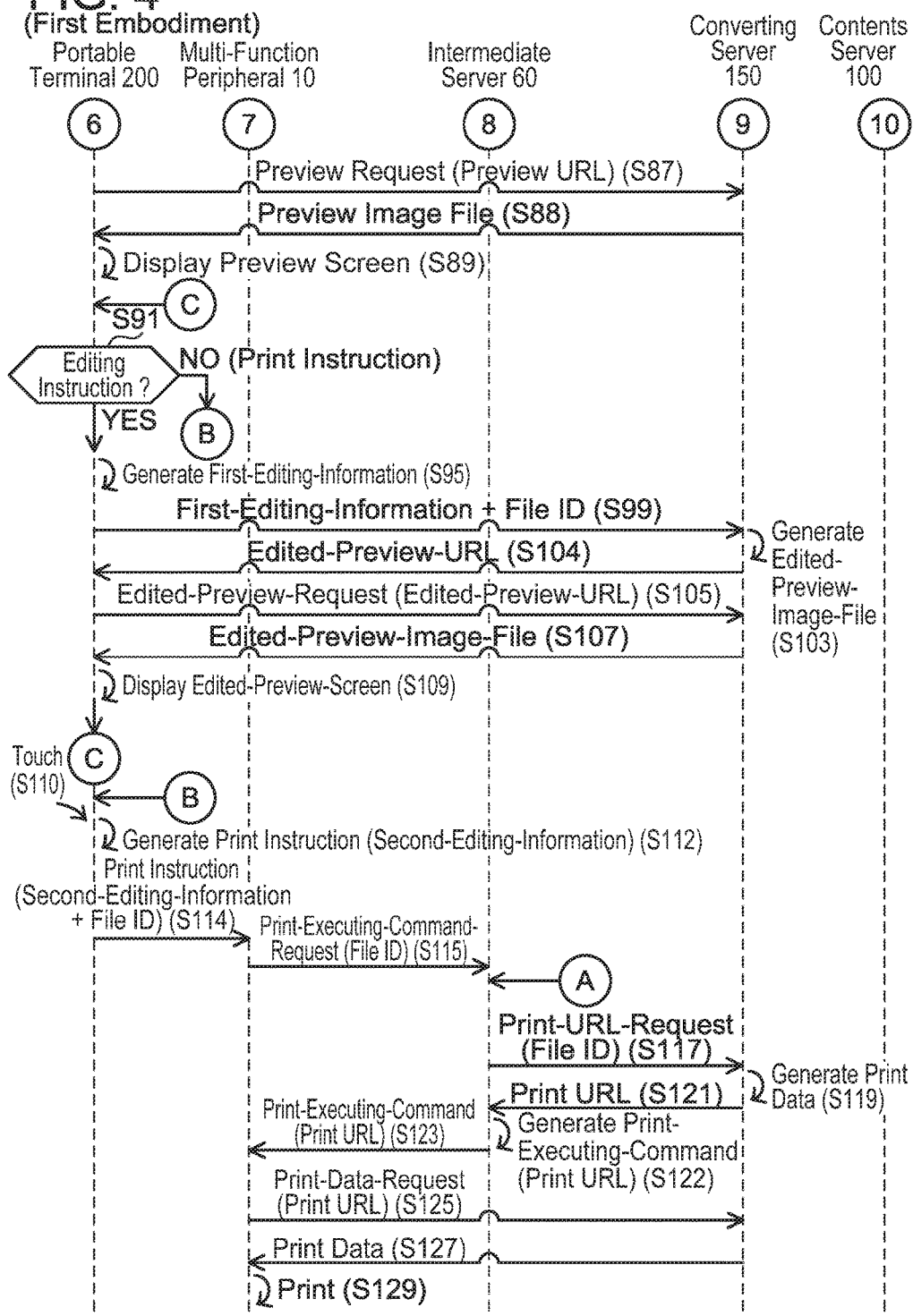
FIG. 4 shows a sequence diagram of respective processes executed by respective devices.
Figure 5:
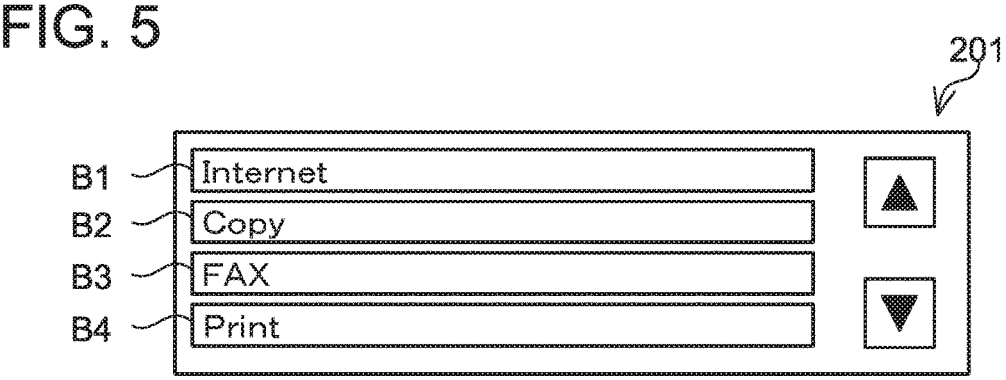
FIG. 5 shows a display example of a main screen.

In the communication system 2 according to the present embodiment, the portable terminal 200 displays an edited preview image that is represented by an edited preview image file generated based on first editing information (S109 in FIG. 4). In addition, the multi-function peripheral 10 executes printing of a target image file based on second editing information (in other words, information corresponding to the first editing information) (S129). By viewing the edited preview image displayed on the portable terminal 200, the user can check a print result based on the second editing information before printing is executed. Furthermore, the converting server 150 is capable of associating a target image file and first editing information with each other using a file ID. Therefore, by sending first editing information and a file ID to the converting server 150 (S99), the portable terminal 200 receives an edited preview image file from the converting server 150 (S107) without involving the multi-function peripheral 10. In other words, since the user need not bring the portable terminal 200 into proximity of the multi-function peripheral 10 to execute NFC communication in order to view an edited preview image, convenience is improved.

In the communication system 2 according to the present embodiment, the user inputs an operation for causing the portable terminal 200 to generate first editing information to the operating unit 262 of the portable terminal 200. Since the operating unit 262 of the portable terminal 200 has higher operability than the operating unit 12 of the multi-function peripheral 10, the user's convenience when inputting an operation can be improved.

With the communication system 2 according to the present embodiment, a selected image file can be appropriately selected among a plurality of image files (S39).

Second Embodiment

In the present second embodiment, the portable terminal 200 sends first editing information to the multi-function peripheral 10 via the NFC_I/F 268 and receives an edited preview URL from the multi-function peripheral 10 via the NFC_I/F 268.

(Operations of Communication System 2)

Operations of the communication system 2 will be described using the sequence diagrams of FIGS. 2, 3, 13, and 14. Processes from S15 in FIG. 2 to S82 in FIG. 3 are similar to those in the first embodiment. However, in the present embodiment, the first NFC execution command data in S76 and S77 does not include a file ID. In addition, in S82, a file ID is not sent from the multi-function peripheral 10 to the portable terminal 200.

In S83, the CPU 22 of the multi-function peripheral 10 sends a second NFC execution command request to the intermediate server 60. The second NFC execution command request refers to a signal for requesting second NFC execution command data. When the CPU 72 of the intermediate server 60 receives the second NFC execution command request from the multi-function peripheral 10, in S84, the CPU 72 generates second NFC execution command data. NFC execution command data includes print selection screen data. The print selection screen data includes a message prompting the portable terminal 200 to be brought into proximity of the multi-function peripheral 10 in a case where the user desires to edit a preview image, a message prompting a button image B71 to be selected in a case where the user desires to print an image, information indicating that the button image B71 is to be included, information indicating that a screen enabling selection of the button image B71 is to be displayed, and information indicating that "OK" corresponds to the button image B71. In S85, the CPU 72 of the intermediate server 60 sends the second NFC execution command data to the multi-function peripheral 10.

Figure 15:
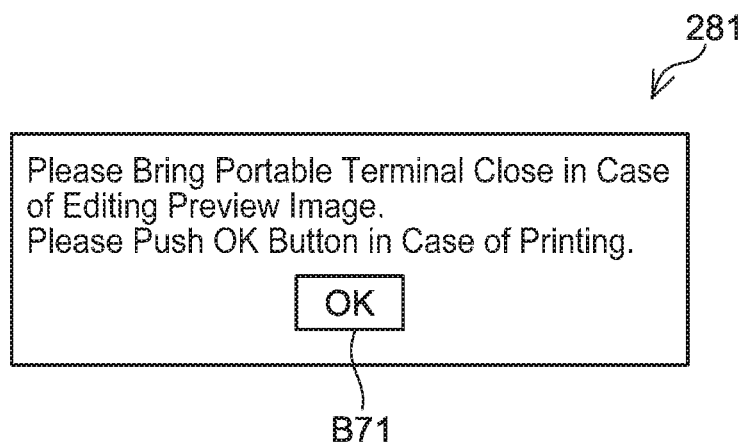
FIG. 15 shows a display example of a print/edit selection screen.

When the CPU 22 of the multi-function peripheral 10 receives the second NFC execution command data from the intermediate server 60, in S86, the CPU 22 executes a process in accordance with the second NFC execution command data. Specifically, the CPU 22 displays a print selection screen 281 shown in FIG. 15 which is represented by print selection screen data on the display unit 14 and maintains an NFC standby state. The print selection screen 281 is a screen for selecting a first option of instructing editing of a preview image file or a second option of instructing execution of printing. The print selection screen 281 includes a message prompting the portable terminal 200 to be brought into proximity of the multi-function peripheral 10, a message prompting the button image B71 to be selected in a case where the user desires to print an image, and the button image B71.

Figure 13:
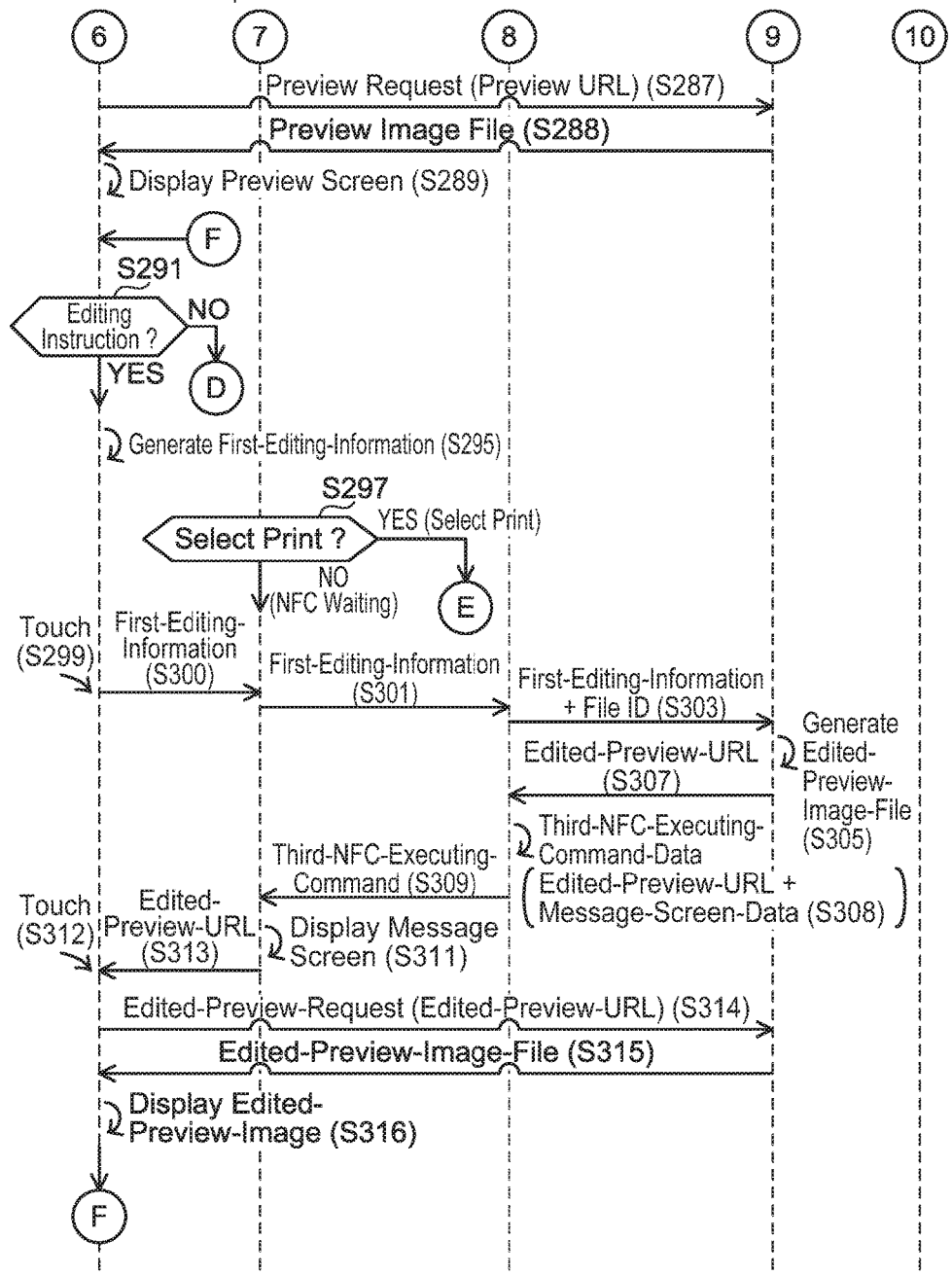
FIG. 13 shows a sequence diagram of respective processes executed by respective devices.

S287 to S295 in FIG. 13 are similar to S87 to S95 shown in FIG. 4. In S297, the CPU 22 of the multi-function peripheral 10 determines whether or not the button image B71 for instructing execution of printing of a preview image file has been selected. In a case where the button image B71 has been selected by the user on the print selection screen 281 (in a case where the second option is selected, S297: YES), the CPU 22 advances to S323 in FIG. 14. On the other hand, in a case where the button image B71 has not been selected by the user on the print selection screen 281 and a process of S299 is executed instead (in a case where the first option is selected, S297: NO), the CPU 22 maintains the NFC standby state.

In S299, the user brings the NFC_I/F 268 of the portable terminal 200 and the NFC_I/F 17 of the multi-function peripheral 10 into proximity within a predetermined distance to automatically execute NFC communication with the portable terminal 200. In S300, the CPU 272 of the portable terminal 200 sends first editing information to the multi-function peripheral 10 via the NFC_I/F 268. When the CPU 22 of the multi-function peripheral 10 receives the first editing information from the portable terminal 200 via the NFC_I/F 17, in S301, the CPU 22 sends the first editing information to the intermediate server 60. When the CPU 72 of the intermediate server 60 receives the first editing information from the multi-function peripheral 10, the CPU 72 specifies the file ID received in S69 in FIG. 3 and, in S303, the CPU 72 sends the file ID and the first editing information to the converting server 150.

S305 is similar to S103 shown in FIG. 4. In S307, the CPU 172 of the converting server 150 sends an edited preview URL to the intermediate server 60. When the CPU 72 of the intermediate server 60 receives the edited preview URL from the intermediate server 60, in S308, the CPU 72 generates third NFC execution command data. The third NFC execution command data refers to data for instructing the multi-function peripheral 10 that NFC communication with the portable terminal 200 is to be executed. The third NFC execution command data includes an edited preview URL and message screen data. The message screen data refers to data including a message prompting the portable terminal 200 to be brought into proximity of the multi-function peripheral 10.

In S309, the CPU 72 of the intermediate server 60 sends the third NFC execution command data to the multi-function peripheral 10. When the CPU 22 of the multi-function peripheral 10 receives the third NFC execution command data from the intermediate server 60, in S311, the CPU 22 executes a process in accordance with the third NFC execution command data. Specifically, the CPU 22 displays the message screen 241 shown in FIG. 9 which is represented by message screen data on the display unit 14 and enters an NFC standby state.

Figure 14:
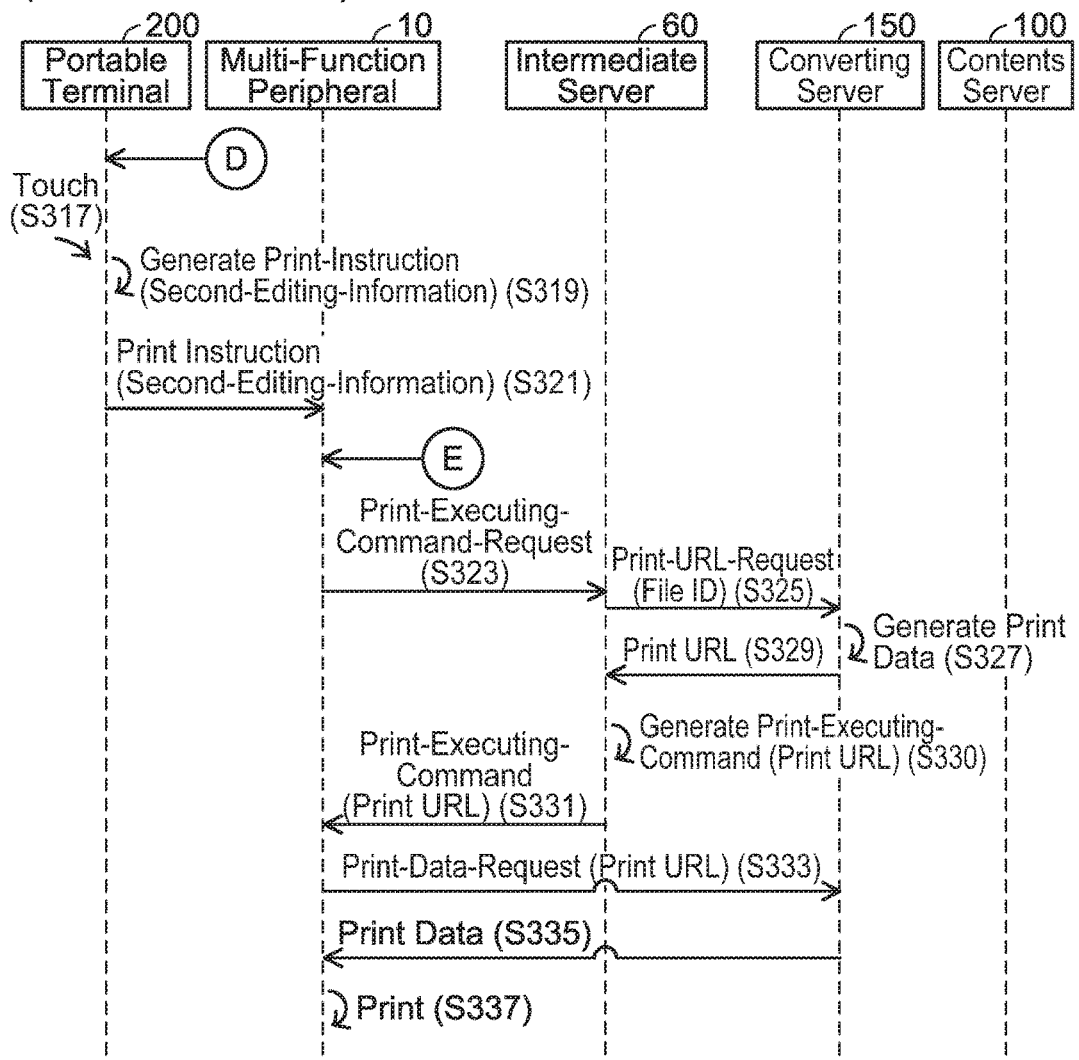
FIG. 14 shows a sequence diagram of respective processes executed by respective devices.

In S312, the user brings the NFC_I/F 268 of the portable terminal 200 and the NFC_I/F 17 of the multi-function peripheral 10 into proximity within a predetermined distance to automatically execute NFC communication with the portable terminal 200. In S313, the CPU 22 of the multi-function peripheral 10 sends an edited preview URL to the portable terminal 200 via the NFC_I/F 17. S314 to S323 in FIG. 14 are similar to S105 to S115 shown in FIG. 4. However, the print instruction in S319 and S321 does not include a file ID. In addition, the print execution command request in S323 does not include a file ID.

When the CPU 72 of the intermediate server 60 receives the print URL request of S323 from the multi-function peripheral 10, the CPU 72 specifies the file ID received in S69 in FIG. 3 and, in S325, the CPU 72 sends the print URL request including the file ID to the converting server 150. S327 to S337 are respectively similar to S119 to S129 shown in FIG. 4.

Effect of Second Embodiment

In the communication system 2 according to the present embodiment, by viewing a preview image displayed on the portable terminal 200, the user can check a print result before printing is executed in a similar manner to the first embodiment.

In the communication system 2 according to the present embodiment, by viewing an edited preview image displayed on the portable terminal 200, the user can check a print result based on second editing information (in other words, information corresponding to first editing information) before printing is executed. In addition, the portable terminal 200 can display an edited preview image (S316) in accordance with whether or not an editing instruction is input (S291 in FIG. 13).

In the communication system 2 according to the present embodiment, in a case where the first option is selected (S297 in FIG. 13: NO), the multi-function peripheral 10 can execute printing of an image based on the second editing information (S337 in FIG. 14). On the other hand, when the second option is selected (S297 in FIG. 13: YES), the multi-function peripheral 10 can execute printing of an image without having the printing being based on the second editing information (S337 in FIG. 14).

In the communication system 2 according to the present embodiment, the user's convenience when inputting an operation to the operating unit 262 of the portable terminal 200 can be improved in a similar manner to the first embodiment.

With the communication system 2 according to the present embodiment, the user can appropriately select a target image file among a plurality of image files.

Modifications

For example, the multi-function peripheral 10 may include an I/F for TransferJet (registered trademark) instead of the NFC_I/F 17. In addition, for example, the portable terminal 200 may include an I/F for TransferJet instead of the NFC_I/F 268. In other words, a "short distance wireless communication technology" is not limited to the NFC technology.

In the second embodiment, S83 to S86 in FIG. 3 and S297 in FIG. 13 need not be executed. In other words, a "display unit" and "display control means" of the image processing apparatus can be omitted.

The portable terminal 200 may include an operating unit that differs from the operating unit 262 (in other words, the touch panel) at a position separated from the display unit 264 and the operating unit may include a plurality of keys. In 895 in FIG. 4, the portable terminal 200 may generate first editing information in accordance with contents of a parameter operation performed on this operating unit.

The "converted image" need not necessarily be a preview image and may be, for example, a thumbnail image. Generally, a "converted image" may be any image represented by image data that is generated by converting an image represented by "target image data".

"Image processing" is not limited to a print process and may be, for example, a FAX sending process.

While cases where the CPUs 22, 72, 172, and 272 of the multi-function peripheral 10, the intermediate server 60, the converting server 150, and the portable terminal 200 execute processes in accordance with software have been described in the present embodiment, this mode is not restrictive. At least a part of the functions realized in accordance with software may be realized by hardware including a logic circuit.

The intermediate server 60 and the converting server 150 are examples of a relay apparatus. The multi-function peripheral 10 is an example of an image processing apparatus. The portable terminal 200 is an example of a terminal apparatus. The content servers 100 and 110 are examples of a server apparatus. The network I/Fs 62 and 162 are examples of an interface of a relay apparatus. The network I/F 16 is an example of a first interface of an image processing apparatus. The NFC_I/F 17 is an example of a second interface of an image processing apparatus. The network I/F 266 is an example of a third interface of a terminal apparatus. The NFC_I/F 268 is an example of a fourth interface of a terminal apparatus. The NYC technology is an example of a short distance wireless communication technology. A preview image file is an example of converted data. A preview image is an example of a converted image. An edited preview image file is an example of edited data. An edited preview image is an example of an edited image. A preview URL is an example of first access information. An edited preview URL is an example of second access information. A print process is an example of image processing. A print instruction is an example of an image processing command. A print URL request is an example of a request signal. A file ID is an example of identification information. First editing information is an example of particular information. File information is an example of corresponding information. Selected, file information is an example of target corresponding information. The CPU executing S65 in FIG. 3 represents an example of "receiving target image data from the server apparatus". The CPU executing S73 in FIG. 3 represents an example of "converting the target image data". The CPU executing S77 in FIG. 3 represents an example of "sending first access information for accessing to the converted data to the image processing apparatus" and "receiving the first access information from the relay apparatus". The CPU executing S82 in FIG. 3 represents an example of "sending the first access information to the terminal apparatus" and "receiving the first access information from the image processing apparatus". The CPU executing S88 in FIG. 4 and S288 in FIG. 13 represents an example of "receiving the converted data from the relay apparatus". The CPU executing S89 and S109 in FIG. 4 and S289 and S316 in FIG. 13 represents an example of "causing the display of the terminal apparatus to display". The CPU executing S114 in FIG. 4 and S321 in FIG. 14 represents an example of "sending an image processing command for executing an image process toward the target image data to the image processing apparatus" and "receiving the image processing command from the terminal apparatus". The CPU executing S115 in FIG. 4 and S323 in FIG. 14 represents an example of "sending a request signal for requesting the target image data to the relay apparatus" and "receiving the request signal from the image processing apparatus". The CPU executing S127 in FIG. 4 and S335 in FIG. 14 represents an example of "sending the target image data to the image processing apparatus" and "receiving the target image data from the relay apparatus". The CPU executing S129 in FIG. 4 and S337 in FIG. 14 represents an example of "executing an image processing". The CPU executing S95 in FIG. 4 and S295 in FIG. 13 represents an example of "generating particular information". The CPU executing S99 in FIG. 4 represents an example of "sending the particular information and the identification information to the relay apparatus" and "receiving the particular information and the identification information from the terminal apparatus". The CPU executing S103 in FIG. 4 and S305 in FIG. 13 represents an example of "generating edited data". The CPU executing S107 in FIGS. 4 and 5315 in FIG. 13 represents an example of "sending the edited data to the terminal apparatus" and "receiving the edited data from the relay apparatus". The CPU executing S291 in FIG. 13 represents an example of "accepting an input of an editing instruction". The CPU executing S300 in FIG. 13 represents an example of "sending the particular information and the identification information to the relay apparatus" and "receiving the particular information and the identification information from the terminal apparatus". The CPU executing S301 in FIG. 13 represents an example of "sending the particular information to the image processing apparatus" and "receiving the particular information from the image processing apparatus". The CPU executing S309 in FIG. 13 represents an example of "sending second access information for accessing the edited data to the image processing apparatus" and "receiving the second access information from the relay apparatus". The CPU executing S313 in FIG. 13 represents an example of "sending the second access information to the terminal apparatus" and "receiving the second access information from the image processing apparatus". The CPU executing S86 in FIG. 3 represents an example of "causing the display of the image processing apparatus to display". The CPU executing S33 in FIG. 2 represents an example of "receiving a plurality of corresponding information corresponding to a plurality of image data including the target image data from the server apparatus". The CPU executing S35 in FIG. 2 represents an example of "sending the plurality of the target information to the image processing apparatus". The CPU executing S39 in FIG. 2 represents an example of "accepting a selection of target corresponding information". The CPU executing S41 in FIG. 2 represents an example of "sending the target corresponding information to the relay apparatus".

What is claimed is:

1. A communication system comprising a relay apparatus, an image processing apparatus and a terminal apparatus, wherein the relay apparatus comprises:
    an interface configured to be capable of communicating with the image processing apparatus, the terminal apparatus and a server apparatus; and
    a controller,
    wherein the image processing apparatus comprises:
    a first interface configured to be capable of communicating with the relay apparatus;
    a second interface configured to be capable of communicating with the terminal apparatus in accordance with a short distance wireless communication technology being capable of communicating in response to coming close to the terminal apparatus within a predetermined distance; and
    a controller,
    wherein the terminal apparatus comprises:
    a third interface configured to be capable of communicating with the relay apparatus;
    a fourth interface configured to be capable of communicating with the image processing apparatus in accordance with the short distance wireless communication technology;
    a display; and
    a controller,
    the controller of the relay apparatus configured to perform:
    receiving target image data from the server apparatus;
    converting the target image data so as to generate converted data; and
    sending first access information for accessing the converted data to the image processing apparatus,
    the controller of the image processing apparatus configured to perform:
    receiving the first access information from the relay apparatus; and
    sending the first access information to the terminal apparatus in accordance with the short distance wireless communication technology in response to detecting a proximity of the terminal apparatus within the predetermined distance,
    the controller of the terminal apparatus configured to perform:
    receiving the first access information from the image processing apparatus in accordance with the short distance wireless communication technology;
    receiving the converted data from the relay apparatus in response to the receiving of the first access information;
    causing the display of the terminal apparatus to display a converted image represented by the converted data after the converted data is received; and
    sending an image processing command for executing an image process toward the target image data to the image processing apparatus in accordance with the short distance wireless communication technology after the first access information is received from the image processing apparatus,
    the controller of the image processing apparatus configured further to perform:
    receiving the image processing command from the terminal apparatus in accordance with the short distance wireless communication technology in response to detecting a proximity of the terminal apparatus within the predetermined distance; and
    sending a request signal for requesting the target image data to the relay apparatus in response to the receiving of the image processing command,
    the controller of the relay apparatus configured further to perform:
    receiving the request signal from the image processing apparatus; and
    sending the target image data to the image processing apparatus in response to the receiving of the response signal,
    the controller of the image processing apparatus configured further to perform:
    receiving the target image data from the relay apparatus; and
    executing an image process toward the target image data.

2. The communication system as in claim 1, wherein
    the sending of the first access information to the image processing apparatus includes sending identification information for identifying the target image data to the image processing apparatus,
    the receiving of the first access information from the relay apparatus includes receiving the identification information from the relay apparatus,
    the sending of the first access information to the terminal apparatus includes sending the identification information to the terminal apparatus in accordance with the short distance wireless communication technology,
    the receiving of the first access data from the image processing apparatus includes receiving the identification information from the image processing apparatus in accordance with the short distance wireless communication technology,
    the controller of the terminal apparatus configured further to perform:

generating particular information for editing the converted data after the converted data is received; and sending the particular information and the identification information to the relay apparatus in response to the receiving of the first access information;

the controller of the relay apparatus configured further to perform:

receiving the particular information and the identification information from the terminal apparatus; and generating edited data being data into which the converted data is edited in response to the receiving of the particular information; and sending the edited data to the terminal apparatus, the controller of the terminal apparatus configured further to perform:

receiving the edited data from the relay apparatus; and causing the display of the terminal apparatus to display an edited image represented by the edited data after the edited data is received, wherein the image processing command sent by the terminal apparatus is a command for instructing that the image processing apparatus executes an image process toward the target image data based on the particular information.

3. The communication system as in claim 2, wherein the particular information is generated by the terminal apparatus based on a user operation inputted through a user interface of the terminal apparatus after the converted image is displayed.

4. The communication system as in claim 2, wherein the particular information is parameter information used in the image process.

5. The communication system as in claim 1, wherein the controller of the terminal apparatus configured further to perform:

generating the particular information for editing the converted data after the converted data is received; and accepting an input of an editing instruction for editing the converted data or an image process instruction for executing the image process; and sending the particular information to the image processing apparatus in accordance with the short distance wireless communication technology in a case of accepting the editing instruction, the controller of the image processing apparatus configured further to perform:

receiving the particular information sent by the terminal apparatus, in accordance with the short distance wireless communication technology in response to detecting a proximity of the terminal apparatus within the predetermined distance; and sending the particular information to the relay apparatus, the controller of the relay apparatus configured further to perform:

receiving the particular information from the image processing apparatus;

generating edited data being data into which the converted data is edited in response to the receiving of the particular information;

sending second access information for accessing the edited data to the image processing apparatus, the controller of the image processing apparatus configured further to perform:

receiving the second access information from the relay apparatus; and sending the second access information to the terminal apparatus in accordance with the short distance wireless communication technology in response to detecting the proximity of the terminal apparatus within the predetermined distance, the controller of the terminal apparatus configured further to perform:

receiving the second access information from the image processing apparatus in accordance with the short distance wireless communication technology; and receiving the edited data from the relay apparatus based on the second access information, the controller of the terminal apparatus configured further to perform:

causing the display of the terminal apparatus to display an edited image represented by the edited data after the edited data is received, wherein the image processing command sent by the terminal apparatus is a command for instructing that the image processing apparatus executes an image process to the target image data based on the particular information, and the image processing command is sent to the image processing apparatus in a case where the image processing command is accepted by the terminal apparatus.

6. The communication system as in claim 5, wherein the image processing apparatus further comprises a display, the controller of the image processing apparatus configured further to perform:

causing the display of the image processing apparatus to display, on the display of the image processing apparatus, a selection screen for selecting a first option for instructing an editing of the converted data or a second option for instructing of an execution of the image process, the selection screen is displayed on the display of the image processing apparatus after the first access information is received, the particular information is received by the image processing apparatus from the terminal apparatus in a case where the first option is selected by the user, the particular information is not received by the image processing apparatus from the terminal apparatus in a case where the second option is selected by the user, the image processing command is not received by the image processing apparatus from the terminal apparatus, and the request signal is sent to the relay apparatus even if the image processing command is not received.

7. The communication system as in claim 1, wherein the converted image represented by the converted data is a preview image of an image represented by the target image data.

8. The communication system as in claim 1, wherein the image process is a print process.

9. The communication system as in claim 1, wherein the controller of the relay apparatus configured further to perform:

receiving a plurality of corresponding information, corresponding to a plurality of image data including the target image data from the server apparatus; and sending the plurality of the target information to the image processing apparatus, the controller of the image processing apparatus configured further to perform:

accepting a selection of target corresponding information corresponding to the target image data from among the plurality of the target information; and sending the target corresponding information to the relay apparatus, and the target image data is received by the relay apparatus hum the server apparatus based on the target corresponding information.

10. A control method performed by a communication system comprising a relay apparatus, an image processing apparatus and a terminal apparatus, wherein the relay apparatus comprises:

an interface configured to be capable of communicating with the image processing apparatus, the terminal apparatus and a server apparatus, wherein the image processing apparatus comprises:

a first interface configured to be capable of communicating with the relay apparatus;

a second interface configured to be capable of communicating with the terminal apparatus in accordance with a short distance wireless communication technology being capable of communicating in response to coming close to the terminal apparatus within a predetermined distance;

wherein the terminal apparatus comprises:

a third interface configured to be capable of communicating with the relay apparatus;

a fourth interface configured to be capable of communicating with the image processing apparatus in accordance with the short distance wireless communication technology; and a display, the method comprising:

receiving target image data by the relay apparatus from the server apparatus;

converting the target image data by the relay apparatus so as to generate converted data; and sending, by the relay apparatus, first access information for accessing the converted data to the image processing apparatus, receiving the first access information by the image processing apparatus from the relay apparatus; and sending the first access information by the image processing apparatus to the terminal apparatus in accordance with the short distance wireless communication technology in response to detecting a proximity of the terminal apparatus within the predetermined distance, receiving the first access information by the terminal apparatus from the image processing apparatus in accordance with the short distance wireless communication technology;

receiving the converted data by the terminal apparatus from the relay apparatus in response to the receiving of the first access information;

causing the display of the terminal apparatus to display a converted image represented by the converted data after the converted data is received; and sending, by the terminal apparatus, an image processing command for executing an image process toward the target image data to the image processing apparatus in accordance with the short distance wireless communication technology after the first access information is received from the image processing apparatus, receiving the image processing command by the image processing apparatus from the terminal apparatus in accordance with the short distance wireless communication technology in response to detecting a proximity of the terminal apparatus within the predetermined distance; and sending, by the image processing apparatus, a request signal for requesting the target image data in response to the receiving of the image processing command, receiving the request signal, by the relay apparatus, from the image processing apparatus; and sending the target image data by the relay apparatus to the image processing apparatus in response to the receiving of the request signal, receiving the target image data by the image processing apparatus from the relay apparatus; and executing an image process toward the target image data by the image processing apparatus.

11. An image processing apparatus comprising:

a first interface configured to be capable of communicating with a relay apparatus;

a second interface configured to be capable of communicating with a terminal apparatus in accordance with a short distance wireless communication technology being capable of communicating in response to coming close to the terminal apparatus within a predetermined distance;

a controller configured to perform:

receiving first access information from the relay apparatus, the first access information being information for accessing converted data which the relay apparatus generates by converting target image data, the target image data being information sent from the a server apparatus to the relay apparatus;

sending the first access information to the terminal apparatus in accordance with the short distance wireless communication technology in response to detecting a proximity of the terminal apparatus within the predetermined distance, the first access information being information used for the terminal apparatus to receive the converted information from the relay apparatus and to display a converted image represented by the converted data;

receiving an image processing command for causing the image processing apparatus to execute an image process toward the target image data from the terminal apparatus in accordance with the short distance wireless communication technology in response to detecting a proximity of the terminal apparatus within the predetermined distance after the first access information is sent to the terminal apparatus;

sending a request signal for requesting the target image data to the relay apparatus in response to the receiving of the image processing command;

receiving the target image data from the relay apparatus after the request signal is sent; and executing an image process to the target image data.

* * * * *

UNITED STATES PATENT AND TRADEMARK OFFICE
CERTIFICATE OF CORRECTION

PATENT NO. : 9,883,059 B2  
APPLICATION NO. : 15/208837  
DATED : January 30, 2018  
INVENTOR(S) : Masayuki Ishibashi Page 1 of 1

It is certified that error appears in the above-identified patent and that said Letters Patent is hereby corrected as shown below:

On the Title Page

Item (57) Abstract, last line should read:  
an image process toward the target image data.

In the Claims

Column 22, Claim 9, Line 61 should read:  
receiving a plurality of corresponding information cor- Column 23, Claim 9, Line 7 should read:  
from the server apparatus based on the target corre- Signed and Sealed this  
Tenth Day of July, 2018

Andrei Iancu  
*Director of the United States Patent and Trademark Office*